US012656113B2

(12) United States Patent
Schmittdiel et al.

(10) Patent No.: US 12,656,113 B2
(45) **Date of Patent: *Jun. 16, 2026**

(54) CONSTRUCTION LASER LEVEL

(71) Applicant: Stanley Black & Decker Inc., New Britain, CT (US)

(72) Inventors: Michael C. Schmittdiel, Baltimore, MD (US); Jia Yong Jiang, Suzhou (CN); Grady Jiqiu Ma, Suzhou (CN); Michael W. Bauer, Baltimore, MD (US)

(73) Assignee: STANLEY BLACK & DECKER INC., New Britain, CT (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/319,938

(22) Filed: May 18, 2023

(65) Prior Publication Data

US 2024/0118078 A1      Apr. 11, 2024

Related U.S. Application Data

(60) Provisional application No. 63/378,416, filed on Oct. 5, 2022.

(51) Int. Cl.
    *G01C 15/00*          (2006.01)
(52) U.S. Cl.
    CPC ................................. *G01C 15/004* (2013.01)
(58) Field of Classification Search
    CPC ............... G01C 15/004; G01C 15/002; G01C 2009/066; G01C 9/06; G01C 15/00; H01M 50/211

USPC .................. 33/286, 228, 290, 291, 227, 299
See application file for complete search history.

(56) References Cited

U.S. PATENT DOCUMENTS

| | | | |
|---|---|---|---|
| 4,752,539 A | 6/1988 | Vatter |
| 5,075,182 A | 12/1991 | Weber |
| 5,212,889 A | 5/1993 | Lysen |
| 5,505,000 A | 4/1996 | Cooke |
| 5,644,850 A | 7/1997 | Costales |
| 5,690,418 A | 11/1997 | Hsiung |
| D464,578 S | 10/2002 | Zurwelle |
| D476,584 S | 7/2003 | Zurwelle |
| 6,782,034 B2 | 8/2004 | Li |
| 6,784,641 B2 | 8/2004 | Sakai et al. |
| 6,931,740 B2 | 8/2005 | Marshall et al. |

(Continued)

FOREIGN PATENT DOCUMENTS

| | | |
|---|---|---|
| CN | 2389350 | 7/2000 |
| CN | 2539956 | 3/2003 |

(Continued)

OTHER PUBLICATIONS

Dewalt cross line laser motorized mount User Manual (Year: 2024).*

(Continued)

*Primary Examiner* — Peter J Macchiarolo
(74) *Attorney, Agent, or Firm* — Womble Bond Dickinson (US) LLP

(57)          ABSTRACT

A laser level system including a laser level and a bracket. The laser level projects at least one laser line and is mounted on the bracket. An integral power source is disposed within an interior of the bracket. The power source powers the laser level and the laser level is rotatable relative to the bracket.

20 Claims, 9 Drawing Sheets

(56) References Cited

U.S. PATENT DOCUMENTS

| | | | |
|---|---|---|---|
| 6,998,821 B2 | 2/2006 | Sakai et al. | |
| 7,055,252 B2 * | 6/2006 | Wu | G01C 15/00 33/286 |
| 7,328,516 B2 * | 2/2008 | Nash | G01C 15/004 33/286 |
| 7,392,592 B2 | 7/2008 | Bublitz et al. | |
| 7,621,652 B2 * | 11/2009 | Zick | F21V 21/406 362/183 |
| 7,797,844 B2 * | 9/2010 | Hobden | G01C 15/004 33/286 |
| 7,886,450 B1 * | 2/2011 | Fiano | G01C 15/105 33/290 |
| 8,511,635 B2 * | 8/2013 | Steffen | G01C 15/004 248/689 |
| 8,668,182 B2 * | 3/2014 | Steffen | G01D 11/30 248/689 |
| 9,109,877 B2 | 8/2015 | Thierman | |
| 9,441,967 B2 | 9/2016 | Ranieri et al. | |
| 9,780,417 B2 | 10/2017 | Mizrahi | |
| 10,006,768 B2 | 6/2018 | Spaulding | |
| 10,363,614 B2 | 7/2019 | O'Sullivan et al. | |
| 10,502,526 B2 | 12/2019 | Norris et al. | |
| 10,566,599 B2 | 2/2020 | Balaster | |
| 10,598,490 B2 | 3/2020 | Yong et al. | |
| 10,823,564 B2 | 11/2020 | Zhuang et al. | |
| 10,824,202 B2 | 11/2020 | Okada et al. | |
| 10,833,376 B2 | 11/2020 | Bonhomme | |
| 11,002,542 B1 * | 5/2021 | King | G01B 11/026 |
| 11,156,736 B1 | 10/2021 | De La | |
| 11,159,026 B2 | 10/2021 | Kim | |
| 11,300,410 B2 | 4/2022 | Hill | |
| 11,320,263 B2 | 5/2022 | Eidinger et al. | |
| 11,668,566 B2 * | 6/2023 | Khan | G01C 15/004 33/286 |
| 11,846,507 B2 * | 12/2023 | Eidinger | G01C 15/004 |
| 12,516,931 B2 * | 1/2026 | Swittel | G01C 15/004 |
| 2003/0014872 A1 * | 1/2003 | Chen | G01C 15/004 33/286 |
| 2004/0205972 A2 * | 10/2004 | Wu | G01C 15/00 33/286 |
| 2005/0172502 A1 * | 8/2005 | Sergyeyenko | G01C 15/004 33/286 |
| 2006/0107539 A1 | 5/2006 | Gamal et al. | |
| 2006/0185181 A1 | 8/2006 | Long et al. | |
| 2006/0221602 A1 | 10/2006 | Zick | |
| 2007/0130785 A1 | 6/2007 | Bublitz et al. | |
| 2013/0229641 A1 | 9/2013 | Wolst et al. | |
| 2014/0093753 A1 | 4/2014 | Scott et al. | |
| 2014/0240125 A1 | 8/2014 | Burch et al. | |
| 2014/0272528 A1 | 9/2014 | Devan et al. | |
| 2014/0352161 A1 | 12/2014 | Ranieri et al. | |
| 2016/0043357 A1 | 2/2016 | Aida et al. | |
| 2016/0293909 A1 | 10/2016 | O'sullivan et al. | |
| 2017/0331083 A1 | 11/2017 | Koenig et al. | |
| 2018/0098445 A1 | 4/2018 | Oguchi et al. | |
| 2019/0001838 A1 | 1/2019 | Choi et al. | |
| 2019/0212782 A1 | 7/2019 | Okada et al. | |
| 2019/0237814 A1 | 8/2019 | Waters | |
| 2019/0319230 A1 | 10/2019 | Bei et al. | |
| 2020/0166340 A1 | 5/2020 | Hinderling | |
| 2020/0240783 A1 * | 7/2020 | Eidinger | G01C 15/004 |
| 2020/0248863 A1 | 8/2020 | Tahir et al. | |
| 2020/0309522 A1 | 10/2020 | Kaneko | |
| 2021/0190491 A1 | 6/2021 | Khan et al. | |
| 2021/0190948 A1 | 6/2021 | Zhang et al. | |
| 2021/0194101 A1 | 6/2021 | Kim et al. | |
| 2021/0223042 A1 | 7/2021 | Hotz et al. | |
| 2021/0239763 A1 | 8/2021 | Shin | |
| 2021/0278211 A1 | 9/2021 | Khan et al. | |
| 2021/0285767 A1 | 9/2021 | Khan et al. | |
| 2021/0310605 A1 | 10/2021 | Millane et al. | |
| 2022/0011105 A1 | 1/2022 | Hotz et al. | |
| 2022/0052542 A1 | 2/2022 | Haldar et al. | |

FOREIGN PATENT DOCUMENTS

| | | |
|---|---|---|
| CN | 2742387 Y | 11/2005 |
| CN | 205138485 U | 4/2016 |
| CN | 106908049 | 6/2017 |
| CN | 207248154 U | 4/2018 |
| CN | 207864936 | 9/2018 |
| CN | 208536838 U | 2/2019 |
| CN | 210622803 | 5/2020 |
| CN | 210893123 | 6/2020 |
| CN | 111399415 | 7/2020 |
| CN | 212179873 | 12/2020 |
| CN | 212300357 U | 1/2021 |
| CN | 212658257 | 3/2021 |
| CN | 213021600 | 4/2021 |
| CN | 213179988 U | 5/2021 |
| CN | 213459974 | 6/2021 |
| CN | 215929100 | 3/2022 |
| EP | 0845821 | 6/1998 |
| EP | 1235051 | 8/2002 |
| EP | 3842741 A1 | 6/2021 |
| WO | WO0041252 | 7/2000 |
| WO | 2009132486 A1 | 11/2009 |
| WO | 2019208938 A1 | 10/2019 |
| WO | WO2020211711 | 10/2020 |
| WO | WO2022058315 | 3/2022 |
| WO | 2022071986 A1 | 4/2022 |

OTHER PUBLICATIONS

Extended European Search Report mailed Mar. 4, 2024 in corresponding EP application No. 23201572.7, 8 pages.

GB Search Report dated Mar. 25, 2024 in corresponding EP application No. 2315209.3, 1 page.

Extended Search Report dated Dec. 17, 2025, in corresponding EP Application No. 25198293.0, 8 pages.

Extended Search Report dated Mar. 4, 2024, in corresponding EP Application No. 23201572.7, 8 pages.

Search Report dated Mar. 25, 2024, in corresponding GB Application No. 2315209.3, 1 page.

* cited by examiner

CONSTRUCTION LASER LEVEL

CROSS-REFERENCE TO RELATED APPLICATIONS

This application claims priority to and the benefit of U.S. Provisional Application No. 63/378,416 filed on Oct. 5, 2023, entitled CONSTRUCTION LASER LEVEL, the entire contents of which are incorporated herein by reference.

FIELD OF THE INVENTION

The present invention relates to laser levels, battery powered laser levels, laser level brackets and laser level systems.

BACKGROUND

There are various existing laser levels and laser level systems. It is desired to provide a laser level with an improved construction.

SUMMARY

According to one aspect, there is an exemplary embodiment of a laser level system, includes a laser level, wherein the laser level is configured to project at least one laser line; and a bracket on which the laser level is mounted. An integral power source disposed within an interior of the bracket. The power source is configured to power the laser level. The laser level is rotatable relative to the bracket.

The laser level may be configured to project a plurality of laser lines.

The power source may include a battery assembly.

The battery assembly may include a battery assembly housing.

The battery assembly may include a plurality of pouch battery cells housed in the battery assembly housing.

The laser level may further include a power port.

The power source may be configured to be charged through the power port.

The bracket may further include a power port.

The power source may be configured to be charged through the power port.

The laser level system may further include a power port.

The power source may be configured to be charged through the power port.

The bracket may include a base and a mounting portion.

The mounting portion may be transverse to the base.

The mounting portion may be configured to be mounted to an object.

The mounting portion may include at least one magnet.

The laser level may be supported on the base.

According to another aspect, there is an exemplary embodiment of a laser level system including a laser level, wherein the laser level is configured to project at least one laser line; and a bracket on which the laser level is mounted. A battery power source is disposed in the bracket. The battery power source is configured to power the laser level. At least one of the laser level and the bracket comprises a power port through which the battery power source can be charged.

The battery power source may include a plurality of battery cells.

The plurality of battery cells may comprise a plurality of pouch cells.

The battery power source may comprise a battery assembly.

The battery assembly may comprises a battery assembly housing and a plurality of battery cells housed in the battery assembly housing.

The bracket may comprise a base and a mounting portion.

The mounting portion may be transverse to the base. The laser level may be supported on the base.

The battery power source may be disposed in the mounting portion of the bracket.

According to another aspect, there is an exemplary embodiment of a laser level system, comprising a laser level. The laser level is configured to project a first laser line and a second laser line perpendicular to the first laser line. The laser level system further includes a bracket comprising a base and a mounting portion transverse to the base, wherein the mounting portion is configured to attach the bracket to a structure. A battery power source is disposed in the mounting portion. The battery power source is configured to power the laser level.

The battery power source may comprise a battery assembly.

The battery assembly may comprise a battery assembly housing and a plurality of cells disposed in the battery assembly housing.

The laser level system may further comprise a power port configured to receive power for charging of the battery power source.

The plurality of cells may be pouch cells.

The pouch cells may include tabs.

The tabs may include a projecting portion and a transverse portion that is transverse to the projecting portion.

The battery assembly may include a circuit board.

The circuit board of the battery assembly may include pads.

The tabs of the pouch cells may engage the pads of the circuit board.

The tabs of the pouch cells may be laser welded to the pads of the circuit board.

The battery assembly may further include gap pads.

The battery assembly housing may further include spacers configured to separate the tabs of the pouch cells.

The mount may include a housing comprising first housing and a second housing.

The battery assembly may be enclosed in the housing.

The battery assembly may be enclosed in the housing between the first housing and the second housing.

The mount housing may form a cavity for holding the battery assembly.

The mount housing may be formed from plastic. The plastic may be a hard plastic. The hard plastic may be an ABS plastic.

The battery assembly may include at least three pouch cells.

The battery assembly may be an integral power source.

The laser level may be a cross-line laser level.

The laser level may be a 3×360 laser level.

The laser level may be a cross and spot laser level.

The laser level may project a first line and a second line perpendicular to the first line. The first line may be a horizontal line and the second line may be a vertical line.

The laser level may be rotatable relative to the mount.

The laser level may be rotatable about a central axis.

The laser level may be rotatable about more than one axis.

The laser level may include user-operable controls.

The mount may include user-actuatable controls.

The user-actuatable controls may function to turn on and off various laser lines or laser spots of the laser level Features and embodiments are further described below by way of exemplary embodiments.

DETAILED DESCRIPTION OF EXEMPLARY EMBODIMENTS

Figure 1:
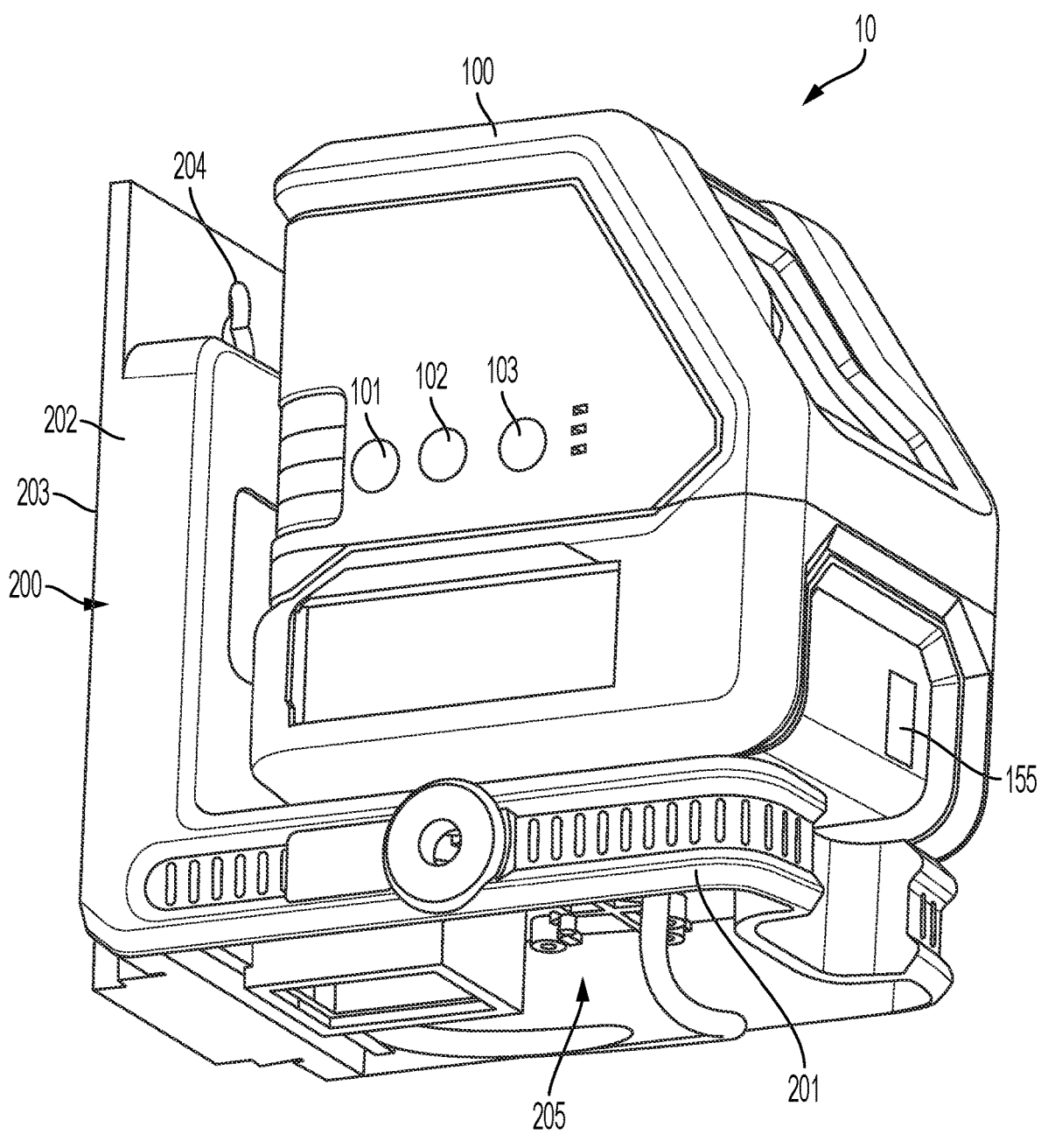
FIG. 1 illustrates a perspective view of a laser level system according to an exemplary embodiment.

FIG. 1 illustrates a non-limiting exemplary embodiment of a laser level system according to the present application. As shown in FIG. 1, the laser level system 10 includes a laser level 100 and a bracket 200. The laser level 100 is rotatably fixed to the bracket 200. In the present exemplary embodiment, the laser level 100 is fixed to the bracket 200. In other embodiments, the laser level 100 may be removably attached to the bracket 200.

The laser level 100 of the exemplary embodiment is rotatable relative to the bracket about a central vertical axis. In the exemplary embodiment, the laser level 100 is rotatable with a gross and fine adjustment. In other embodiments, the laser level 100 may be rotatable about more than one axis such as, for example, multiple vertical axes or multiple vertical axes and a non-vertical axis. The laser level 100 of the exemplary embodiment is a cross line and plumb spot laser. Accordingly, it is configured to project a vertical line, a horizontal line that crosses with the vertical line, and a plumb spot. In other embodiments, the laser level 100 may project a variety of different lines or spots. For example, in other embodiments the laser may be a 3×360 laser level, a cross-line laser level or may project lines and spots in various numbers. A laser spot may also be referred to as a laser dot. A 3×360 laser level may project three lines. The three lines may include two vertical lines and one horizontal line. The two vertical lines may be generally perpendicular to one another. The 3×360 laser level may include three laser generators each including a laser diode for producing each of the lines. A cross-line laser level may project a vertical line and a horizontal line intersecting. Various dots may be added to a cross-line laser level such as five dots. For example, a laser level may project a vertical line, a horizontal line, an upward dot, a downward dot, a forward dot, a leftward dot and a rightward dot. The internals and general operation of various types of cross, dot and cross and dot laser levels is known. For example, the internal structure and operation of a 3×360 laser level and operation is shown and described in U.S. Patent Application Publication No. 2018/0321035. U.S. Patent Application Publication No. 2018/0321035 is hereby incorporated by reference. Internal structure of a laser level for projecting cross-lines and dots is shown in U.S. Patent Application Publication No. 2018/0106616. U.S. Patent Application Publication No. 2018/0106616 is hereby incorporated by reference. Internal structure of a laser level for projecting five dots is shown in U.S. Patent Application Publication No. 2017/0314921. U.S. Patent Application Publication No. 2017/0314921 is hereby incorporated by reference.

The laser level 100 of the present exemplary embodiment includes three user-operable actuators 101, 102, 103. The actuators selectively activate and deactivate the vertical line, horizontal line, and the plumb spot. In this manner, the user may choose to select any combination of the laser lines or spot to project. For example, a user may activate the vertical line and the plumb spot, but not the horizontal line. This allows the user to project only the lines or spots desired by the user and may save charge of a power source such as a battery. The laser level 100 may also include a state of charge indicator 104 indicating a state of charge of the power source 300 for the laser level system 10.

Figure 2:
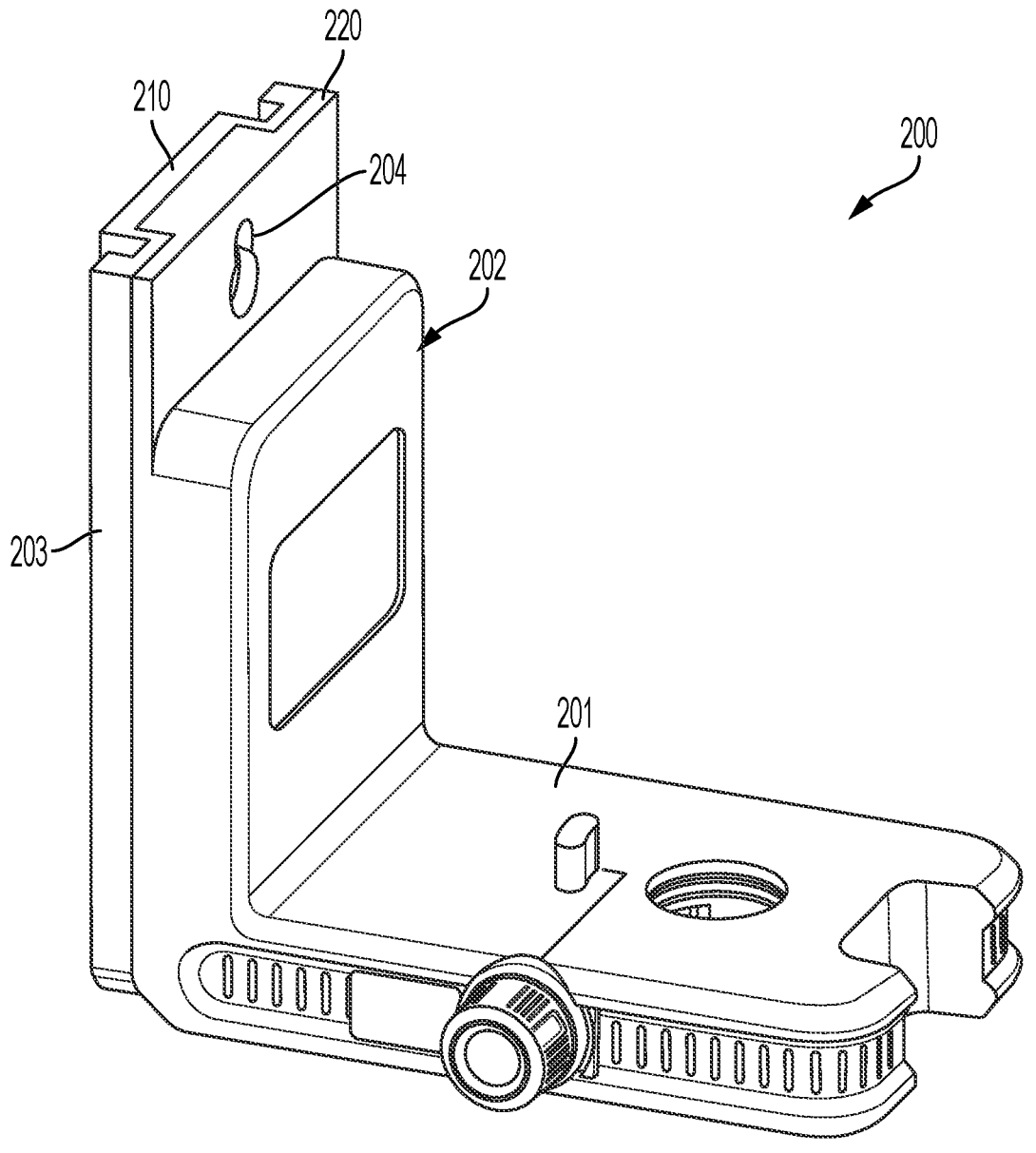
FIG. 2 is a perspective view of a bracket of the exemplary embodiment of the laser level system.
Figure 3:
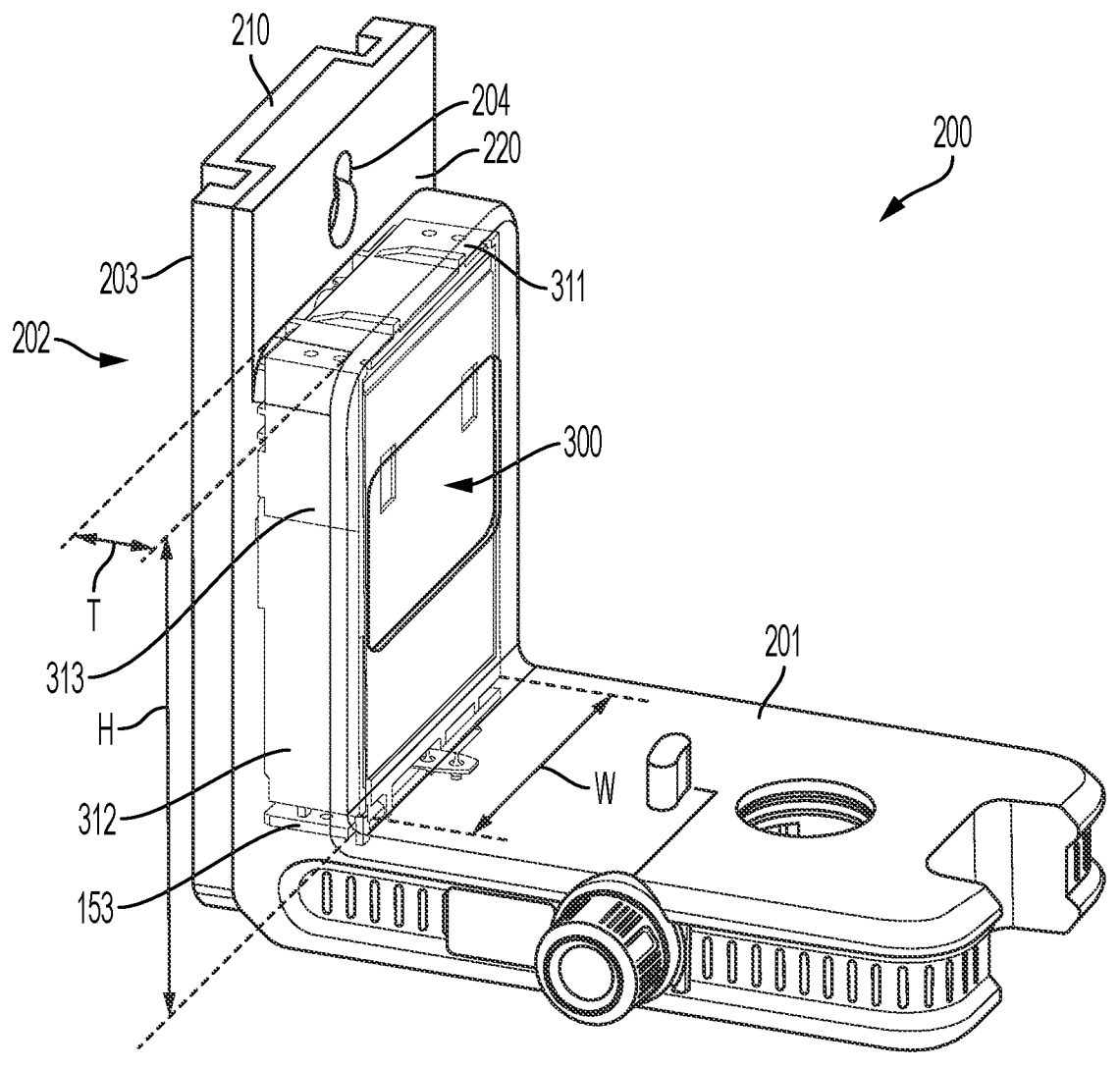
FIG. 3 is a partially shadowed perspective view of a bracket of the exemplary embodiment of the laser level system.

As further shown in FIGS. 1-3, the laser level system 10 further includes a bracket 200. As shown, the bracket includes a base 201 and a mounting portion 202. The laser level 100 is supported on the base 201. The mounting portion 202 can be mounted to a surface. In the exemplary embodiment, the mounting portion 202 includes a plurality of magnets at a rear side 203 of the mounting portion 202. The magnets allow the mounting portion 202 to be mounted to a metal object such as a metal beam. As will be appreciated, the level assembly 10 is thus attached to the metal beam. When the mounting portion 202 is attached to a flat vertical surface, the mounting portion 202 extends vertically and the base 210 portion extends transversely to the mounting portion 202 in a horizontal direction. When leveled, the laser level 100 projects a horizontal beam perpendicular to the mounting portion 202 and parallel to the base 201.

The mounting portion 202 may including alternative or additional attachment or mounting structures. For example, the exemplary embodiment includes a hanging hole 204. The hanging hole 204 allows the bracket 200 to be hung on a screw or nail. The hanging hole 204 of the exemplary embodiment has a wider portion at the bottom to allow a screw or nail head to protrude through and a narrower portion at the top. The wider portion of the hanging hole 204 can be moved over the head of a nail or screw that is secured to a wall and then the bracket 200 can be allowed to be lowered so that the nail or screw head is aligned with the narrower portion at the top of the hanging hole 204. In order to remove the bracket 200, the process is reversed as the mount is lifted to align the wider portion of the hanging hole 204 with the screw or nail thread and then the bracket 200 can be removed from the nail or screw.

In other embodiment there may be other attachment structures such as a securing clamp or a strap.

The base 201 of the exemplary embodiment includes a screw thread attachment 205. The screw thread attachment 205 allows the base to be connected to a tripod or other stand or device. In some exemplary embodiments, there may be more than one screw thread attachment of different sizes to accommodate various attachments.

As shown in FIGS. 1-3, the mounting portion 202 has a housing portion 210 that provides a cavity for a power source 300. In FIGS. 1 and 2, the housing portion 210 is shown as solid. In FIG. 3 the housing portion 210 is shown in partial shadow and the power source 300 can be seen. As shown, the housing portion 210 provides a generally rectangular cavity and the power source 300 has a generally rectangular shape. As shown, the power source 300 has a height H travelling along the height of the mounting portion 202. The power source 300 has a thickness T in the direction of the projection of the base 201. The power source 300 has a width W along the width of the bracket 200. In the exemplary embodiment, the height H is greater than the width W. Also, the width W is greater than the thickness T. These dimensions may allows a compact laser level system 10 that is configured to be mounted as discussed above. For example, in the exemplary embodiment, the thickness T is relatively small and less than the height H or width W. This allows the laser level 100 to be relatively close to the mounting portion 202 and the mounting rear surface 203. Since the laser level 100 has weight, positioning the laser level 100 relatively close to the mounting portion 202 and the mounting rear surface 203 may allow for easier or more secure mounting. The further away the laser level is from the mounting rear surface 203, the greater the mounting force required from any magnets to mount the laser level system 10. The power source 300 of the exemplary embodiment is an integral power source 300 that is built into the laser level system 10. The integral power source 300 of the exemplary embodiment is intended to remain part of the laser level system 10 during normal usage such as through charging cycles, in contrast to a removable power tool battery pack that is configured to be routinely removed and replaced in the normal course of use.

The bracket 200 may comprise a housing including a first housing part 210 and a second housing part 220. The first housing part 210 and the second housing part 220 may be made of plastic, for example a hard plastic such as an ABS plastic. The power source 300 may be held between the first housing part 210 and the second housing part 220. As shown, the power source 300 may be enclosed within the bracket 200 and in particular within the housing comprising the first housing part 210 and the second housing part.

The thickness T of the power source 300 may be less than 50 millimeters (mm), less than 40 mm, less than 30 mm, or less than 20 mm. The height H of the power source 300 may be less than the height of the mounting portion 202. The width W of the power source 300 may be less than the width of the base 201.

Figure 4:
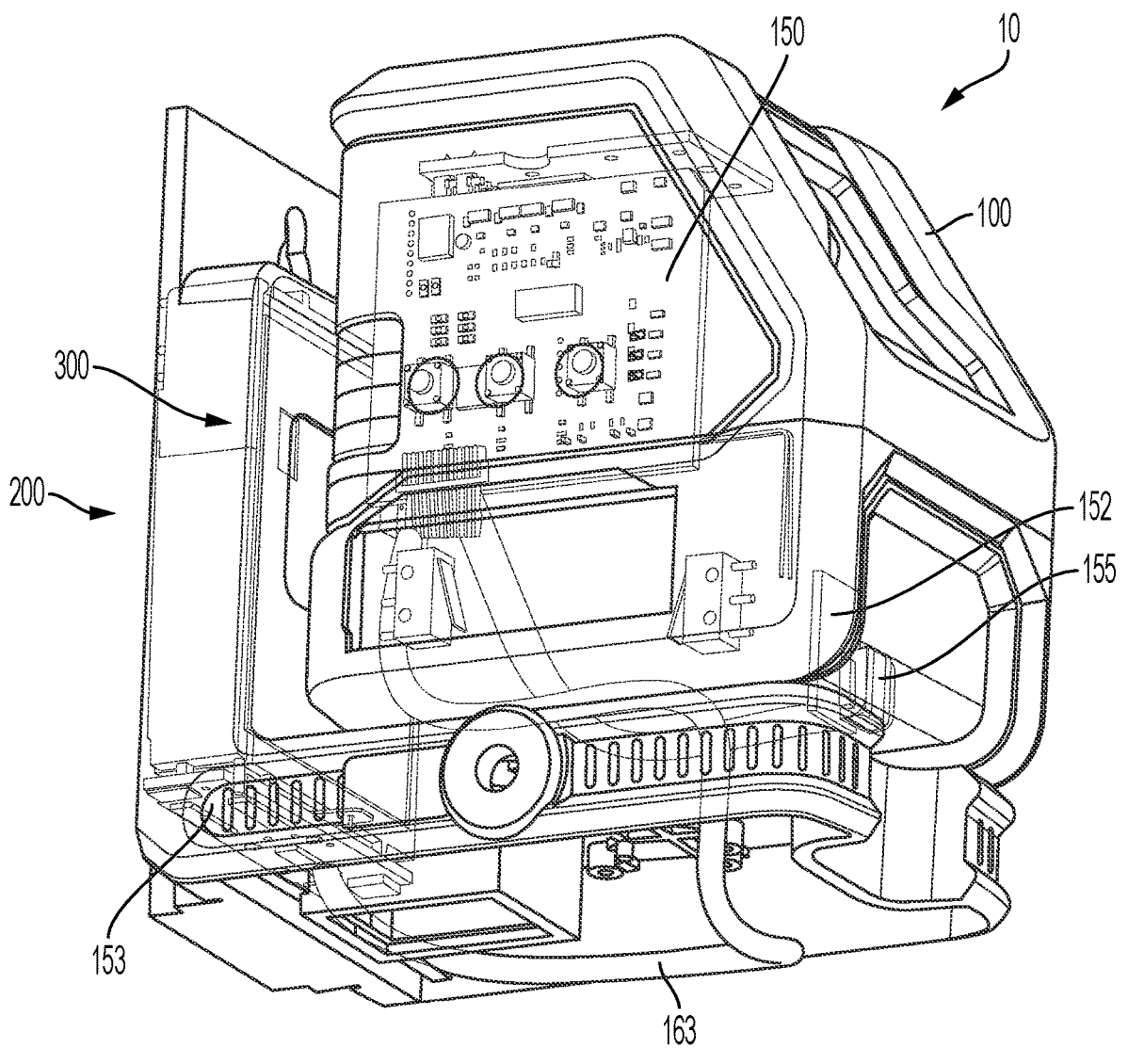
FIG. 4 is a partially shadowed perspective view of a laser level system according to an exemplary embodiment.
Figure 5:
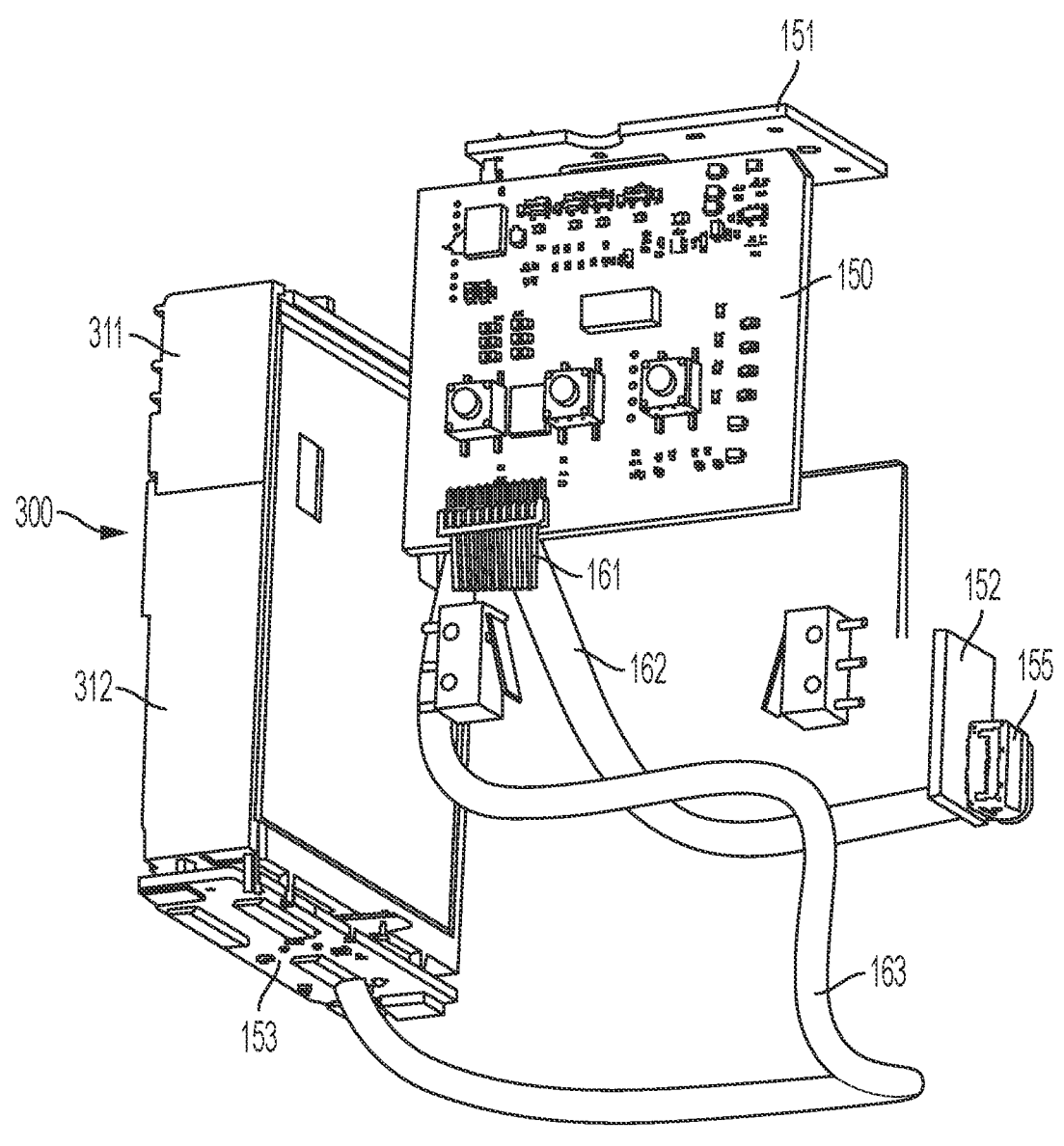
FIG. 5 is an illustration of a perspective view of electrical components of the laser level system according to the exemplary embodiment.

FIG. 4 is a partial shadow view of the laser level system 10 illustrating some internal components of the laser level system 10. FIG. 5 is a perspective view of an electrical assembly of the laser level system 10.

As shown in FIGS. 4 and 5, the laser level 100 includes a first printed circuit board 150, a second printed circuit board 151 and a third circuit board 152 which may also be a printed circuit board. Various electrical components may be mounted on the circuit boards 151, 152 and 153. These electronic components may include a controller, such as a micro-processor, and various sensors such as an accelerometer, current sensor, light sensor or other of a variety of known sensors. The electronic components may include charging circuitry for charging the power source 300.

As shown, actuators 101, 102 and 103 are mounted on printed circuit board 150. A port 155 is mounted on the circuit board 152. The port 155 may be a USB port and may be used for the transfer of power and/or data. The port 155 may receive or distribute power and receive or distribute data. As shown in FIG. 1, the port 155 is accessible by a user at the laser level 100. A user may plug in a USB cord connected to a wall outlet to supply an electrical charge to the laser level system 10 through the port 155. For example, the electrical charge may be provided to the laser level system 10 in order to charge the power source 300 and may do so through charging circuitry on one or more of the circuit boards 151, 152, 153. The user may also plug in a USB cord connected to a computing device such as a laptop computer or a smartphone. The user may then download data from the laser level system 10 or provide updated data or programming to the laser level system 10. The downloaded data may include use information such as time used or temperature detected during use.

As shown, the circuit boards 150, 151, 152 and 153 are electrically connected to one another through wires 161, 162 and 163. The wires 161, 162, 163 provide electric and data communication between the circuit boards 150, 151, 152 as well as the power source 300. Accordingly, for example, a controller may be mounted on a circuit board 151 and control various components on the circuit boards 151 and 152. As another example, the port 155 may be mounted on another or additional circuit board and accessible elsewhere. For example, the port 155 may be part of the bracket 200 rather than the laser level 100.

Figure 6:
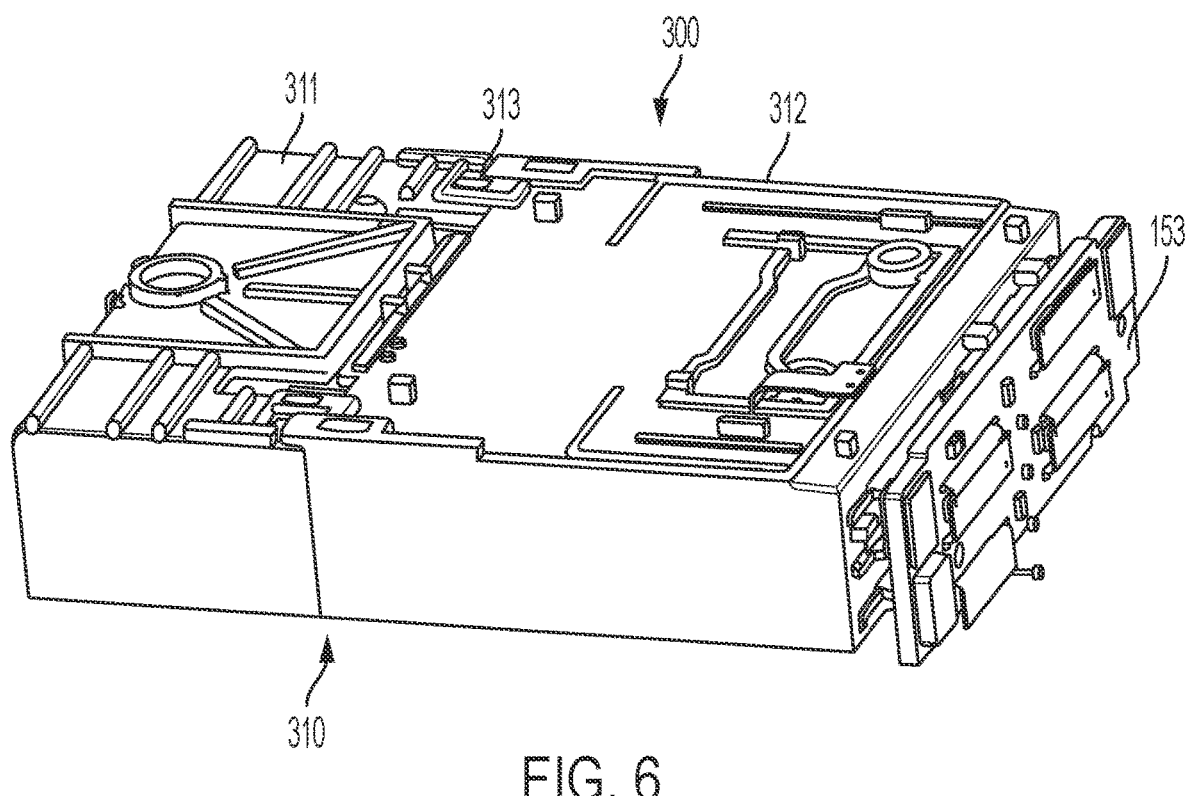
FIG. 6 is a perspective view of a battery assembly according to an exemplary embodiment.
Figure 7:
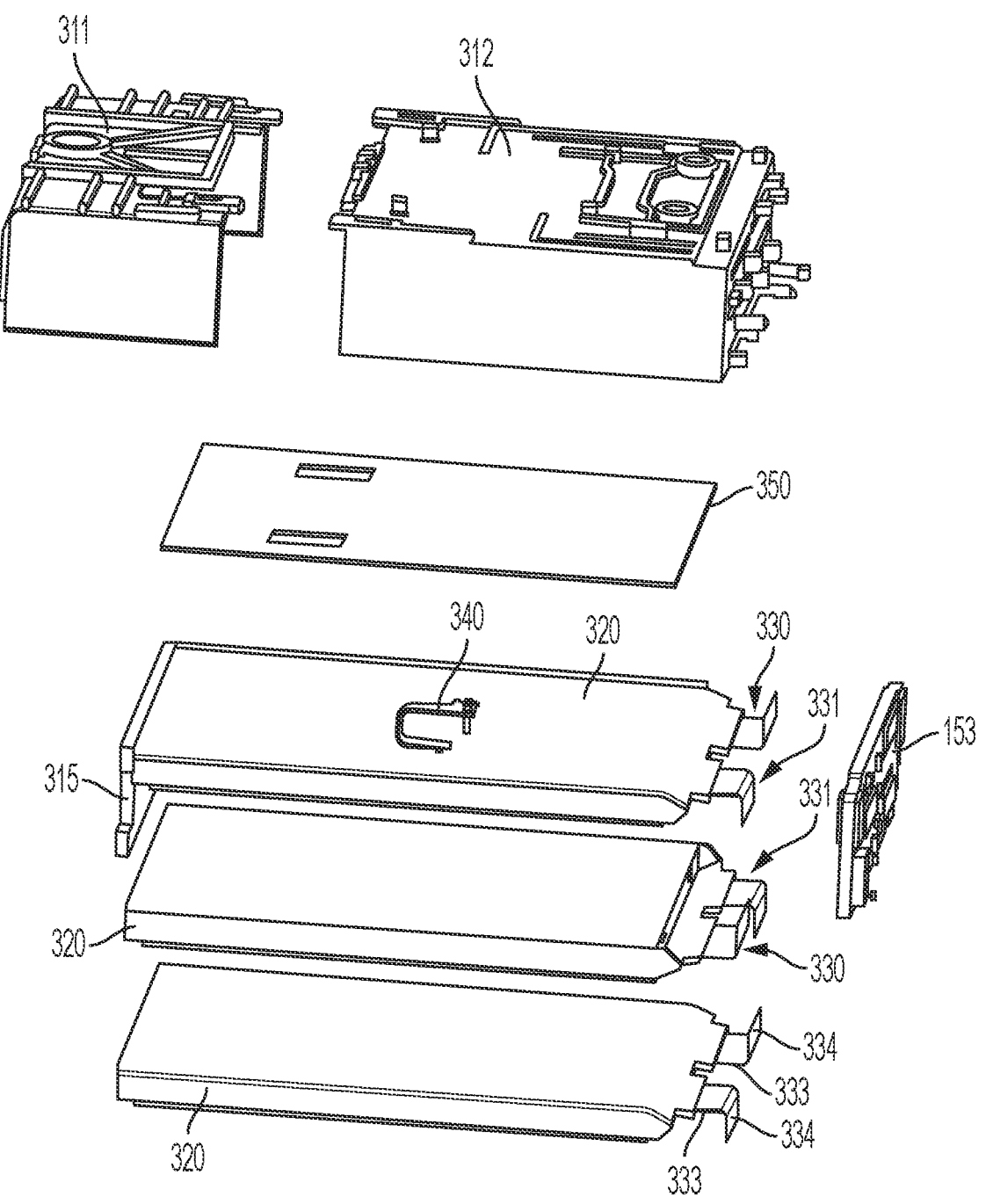
FIG. 7 is an exploded view of the battery assembly according to the exemplary embodiment.

FIGS. 6 and 7 illustrate an embodiment of the power source 300. In the exemplary embodiment, the power source 300 is a battery power source in the form of a battery cell stack assembly or battery assembly 300. FIG. 6 is a perspective view of the battery assembly 300. FIG. 7 is an exploded view of the battery assembly 300.

The battery assembly 300 includes a housing 310. The housing 310 includes a rear housing 311 and a front housing 312. The rear housing 311 is generally rectangular shaped with an open forward end. The front housing 312 has a generally rectangular shape with an open rearward end. The rear housing 311 and the front housing 312 attach together to form the rectangular box housing 310 which includes a rectangular box shaped cavity for containing battery cells. The rear housing 311 and the front housing 312 generally meet at the connection point 313. The front housing 312 is considered a front housing because it contains a forward or front portion of the battery cells 320 relative to the rear housing 311. The housing 310 may have an open top. This allows the battery cells 320 to be placed into the housing 310. The housing 310 may then include a top housing part to close the top after the battery cells 320 are placed into the front and rear housings 312, 311. The top may also be left open and enclosed by the structure of the bracket 200.

FIG. 7 is an exploded view of the battery assembly 300. As shown, the battery assembly 300 includes three battery pouch cells 320. The pouch cells are battery cells which may have any battery chemistry including various Lithium-ion or other battery cell chemistries. The pouch cells have a pair of electrical tabs 330 and 331 at a front end thereof. The tabs 330 and 331 have a generally "L" shape with a projecting portion 333 that projects in the same direction as the longitudinal length of the battery cell 320 and a transverse portion 334 at a direction generally transverse to the projecting portion 333. In the exemplary embodiments, the transverse portion 334 is generally perpendicular or perpendicular to the projecting portion 333. As shown, the transverse portion 334 of first electrical tab 330 extends in the opposite direction of the transverse portion 334 of the second electrical tab 331.

As further shown in FIG. 7, the battery assembly 300 may further include a gap pad 350. The gap pad 350 absorbs expansion from the battery cells 320. For example, the gap pad 350 may be a foam pad such that it can be compressed if the battery cells 320 expand. This prevents undue pressure from being placed on the housing 300 or the battery cells 320. In the exemplary embodiment of FIG. 7, the gap pad 350 is disposed between the battery cell 320 and the housing 300. In other embodiments, the gap pad 350 may be placed elsewhere and there may be more than one gap pad 350.

The battery assembly 300 also includes a thermistor 340. The thermistor 340 is connected to the circuit board 153. The circuit board 153 may include a controller mounted thereon or may be connected to a controller. If a thermistor measures a temperature that is above a threshold, the controller may shut off power from the battery assembly 300, lower the power level supplied from the battery assembly 300 or take some other action.

The battery assembly 300 may further include a structural support plate 315. The structural support plate 315 is located at a rear end of the battery cells 320 and abuts a rear end of the housing 300. The structural support plate 315 may strengthen the battery assembly 300 and help with alignment.

The first and second electrical tabs 330, 331 are electrically connected to the circuit board 153. In the exemplary embodiment, the tabs 330, 331 are soldered to the circuit board 153. In some embodiments, the tabs 330, 331 may be electrically connected to the circuit board 153 by soldering or other structures or methods and may also projects through the circuit board 153.

As shown in FIGS. 2 and 3, the battery assembly 300 is disposed in the mounting portion 202. The circuit board 153 is at a bottom of the battery assembly 300 when disposed in the mounting portion 202 of the bracket 200 such that the circuit board 153 is adjacent to the base 201. Accordingly, the tabs 330, 331 are also at the bottom and adjacent to the base 201.

The battery assembly 300 includes three pouch battery cells 320. In other embodiments, the battery assembly 300 may include a lesser or greater number of pouch battery cells 320, such as four, five, six or more pouch battery cells 320. Additionally, in other embodiments, the battery cells may be a different size or shape. For example, instead of pouch battery sells, the battery assembly may include one or more cylindrical battery cells. The cylindrical battery cells may be arranged with their longitudinal axis extending vertically or horizontally.

In the exemplary embodiment of FIGS. 1-7, the battery assembly 300 includes a battery assembly housing 310 and the battery assembly housing 300 is housed in the bracket 200. In particular, the pouch battery cells 320 are housed in the battery assembly housing 310, with a portion (particularly the tabs 330, 331) projecting out of the assembly housing 310. The battery assembly housing 310 is then housed in the bracket 200. In other embodiments, the battery assembly may lack a separate battery assembly housing. Instead, the battery assembly may be directly housed in the bracket 200. The bracket 200 may include internal ribs or other features for directly housing the battery assembly without an intermediate battery assembly housing 310.

The battery assembly 300, or another variation of the battery assembly as described herein, may also be located at a different position than that shown in the exemplary embodiment of FIGS. 1-7. For example, the battery assembly 300 may be disposed on the base 201, for example on the top or bottom of the base 201. If disposed on the bottom of the base 201, the screw thread of the base may be eliminated or the battery assembly or base may be modified to accommodate the battery assembly and a screw thread.

The battery assembly 300 or other variation may also be incorporated into the laser level 100 rather than the bracket 200. For example, the battery assembly 300 may be incorporated into the rear side of the laser level 100 closest to the mounting portion 202 of the mount. In that case, there may be no need for wiring or other electrical connection between the mount and laser level. Locating the battery assembly in a rear side of the laser level may be advantageous for keeping a compact design and maintaining weight near the mounting portion 202 in order to provide for effective mounting of the laser level system 10. The battery assembly may also be located in other areas of the laser level 100 such as the top, one or both of the sides or elsewhere.

Figure 8:
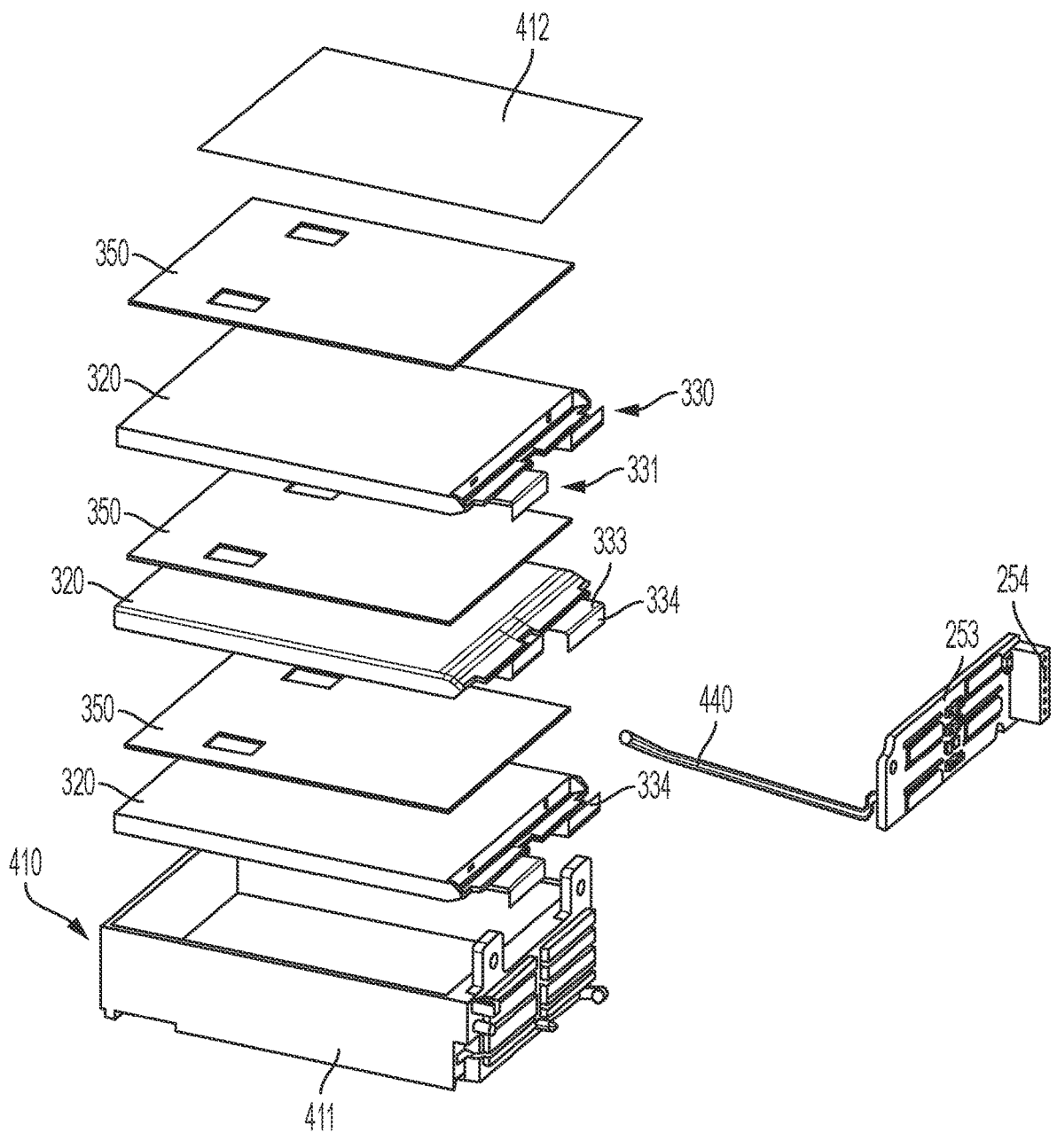
FIG. 8 is an exploded view of a battery assembly according to another exemplary embodiment.
Figure 9:
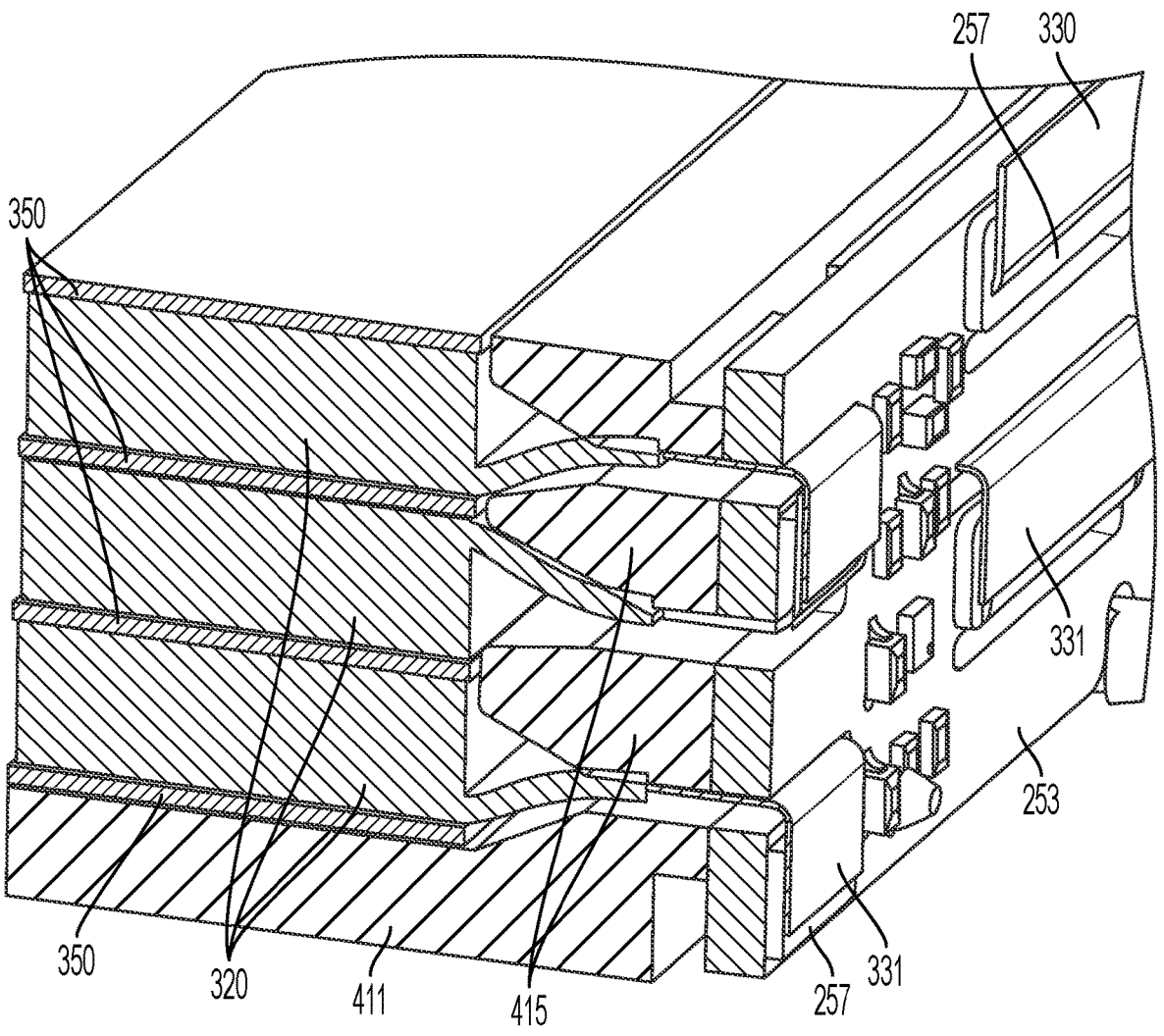
FIG. 9 is close-up perspective view of a portion of the battery assembly according to an exemplary embodiment.

FIGS. 8 and 9 illustrate another exemplary embodiment of a battery assembly 400 that may be used instead of the battery assembly 300. The battery assembly 400 is similar to battery assembly 300 unless otherwise noted. FIG. 8 is an exploded view of the battery assembly 400 and FIG. 9 is a close-up perspective view of a portion of a front corner of the battery assembly 400.

As shown in FIG. 8, the battery assembly 400 includes three pouch battery cells 320. The pouch battery cells include first tabs 330 and second tabs 331, as described above. The exemplary embodiment of a battery assembly 400 includes three gap pads 350.

The battery assembly 400 includes a battery housing 410. The battery housing 410 includes a first housing part 411 and a second housing part 412. The first housing part 411 includes a bottom and four sidewalls. Each of the three pouch battery cells 320 and the gap pads 350 may be placed in the first housing part 411. The second housing part 412 can then be attached to the first housing part 411 to enclose the battery cells 320 and gap pads 350. The second housing part 412 may be secured to the first housing part 411 by snap fit, fasteners, adhesives or other structures or methods.

The battery assembly 400 further includes a circuit board 253. The circuit board 253 is generally the same as circuit board 153, but the circuit board includes a wire harness connector 254 for receiving wires. Additionally, the battery assembly 400 includes a thermistor 440. The thermistor 440 serves the same function as the thermistor 340. The thermistor 440 may extend along a length of the battery assembly 400. Various components and designs between the two battery assemblies and circuit boards may be combined or substituted. For example, the circuit board 253 may instead have wires soldered onto the circuit board and the circuit board 153 may include a wire harness connector. As another example, the thermistor 440 may be used in the battery assembly 300.

FIG. 9 illustrates a connection between tabs 330, 331 and a printed circuit board such as printed circuit board 253. As shown, the tabs 330 and 331 may vary is size and location. The first housing part 411 includes spacers 415. Tabs 330 and 331 project through holes between the spacers 415. The spacers 415 provide a physical distance between the tabs 330 and 331 and help to prevent a short during assembly or usage. The transverse portions 334 of the tabs 330, 331 abut pads 257 on the printed circuit board 253 and are laser welded to the pads 257. This provides an electrical connection between the battery cells 320 and the printed circuit board 253.

The exemplary embodiments describe an integral power source. However, it is contemplated that various features of the present application may be applied to, combined with or include a removable power tool battery pack which is configured to be removed and power other devices such as a drill, saw or sander. In another exemplary embodiment, the laser level system 10 may use a removable power tool battery pack. The mounting portion 202 of the bracket 10 may include a battery receiving portion facing the laser level 100. The battery receiving portion may include rails and an electrical connector for engaging with electrical connectors of the removable power tool battery pack. In an embodiment, the power tool battery pack may be charged while received in the battery pack receiving portion.

While the invention has been described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A laser level system, comprising:
a laser level, wherein the laser level is configured to project at least one laser line;
a bracket comprising a base and a mounting portion transverse to the base, the laser level mounted on the base; and
a power source disposed within an interior of the mounting portion of the bracket so as to be integrally formed with the bracket;
wherein the power source is configured to power the laser level; and
wherein the laser level is rotatable relative to the bracket.

2. The laser level system of claim 1, wherein the laser level is configured to project a plurality of laser lines.

3. The laser level system of claim 1, wherein the power source comprises a battery assembly.

4. The laser level system of claim 3, wherein the battery assembly comprises a battery assembly housing; and
wherein the battery assembly comprises a plurality of pouch battery cells housed in the battery assembly housing.

5. The laser level system of claim 1, wherein the laser level further comprises a power port; and
wherein the power source is configured to be charged through the power port.

6. The laser level system of claim 1, wherein the bracket further comprises a power port; and
wherein the power source is configured to be charged through the power port.

7. The laser level system of claim 1, wherein the laser level system further comprises a power port; and
wherein the power source is configured to be charged through the power port.

8. The laser level system of claim 1, wherein the bracket comprises a first housing part and a second housing part, the power source positioned between the first housing part and the second housing part in an interior of the mounting portion of the bracket.

9. The laser level system of claim 1, wherein the mounting portion is configured to be mounted to an object.

10. The laser level system of claim 9, wherein the mounting portion comprises at least one magnet.

11. The laser level system of claim 10, wherein the laser level is supported on the base.

12. A laser level system, comprising:
a laser level, wherein the laser level is configured to project at least one laser line;
a bracket comprising a mounting portion and a base on which the laser level is mounted; and
a battery power source enclosed in a cavity in the mounting portion of the bracket;
wherein the battery power source is configured to power the laser level; and
wherein at least one of the laser level and the bracket comprises a power port through which the battery power source can be charged.

13. The laser level system of claim 12, wherein the battery power source comprises a plurality of battery cells.

14. The laser level system of claim 13, wherein the plurality of battery cells comprises a plurality of pouch cells.

15. The laser level system of claim 12, wherein the battery power source comprises a battery assembly.

16. The laser level system of claim 12, wherein the battery assembly comprises a battery assembly housing and a plurality of battery cells housed in the battery assembly housing.

17. The laser level system of claim 12,
wherein the mounting portion is transverse to the base; and
wherein the laser level is supported on the base.

18. A laser level system, comprising:
a laser level, wherein the laser level is configured to project a first laser line and a second laser line perpendicular to the first laser line;
a bracket comprising a base and a mounting portion transverse to the base, wherein the mounting portion is configured to attach the bracket to a structure; and
a battery power source enclosed in a cavity in a housing portion of the mounting portion;
wherein the battery power source is configured to power the laser level.

19. The laser level system of claim 18, wherein the battery power source comprises a battery assembly; and
wherein the battery assembly comprises a battery assembly housing and a plurality of cells disposed in the battery assembly housing.

20. The laser level system of claim 19, further comprising a power port configured to receive power for charging of the battery power source.

* * * * *